Figure 21:
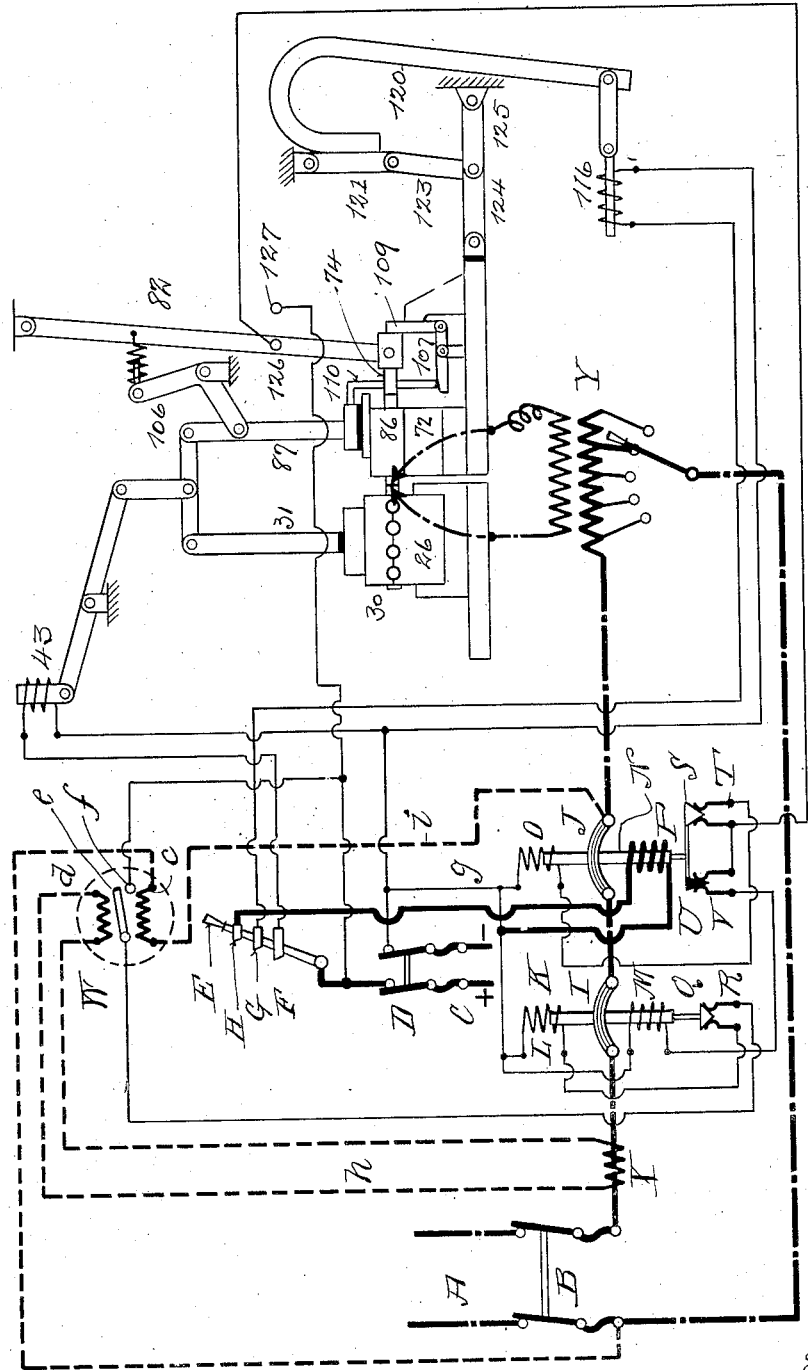

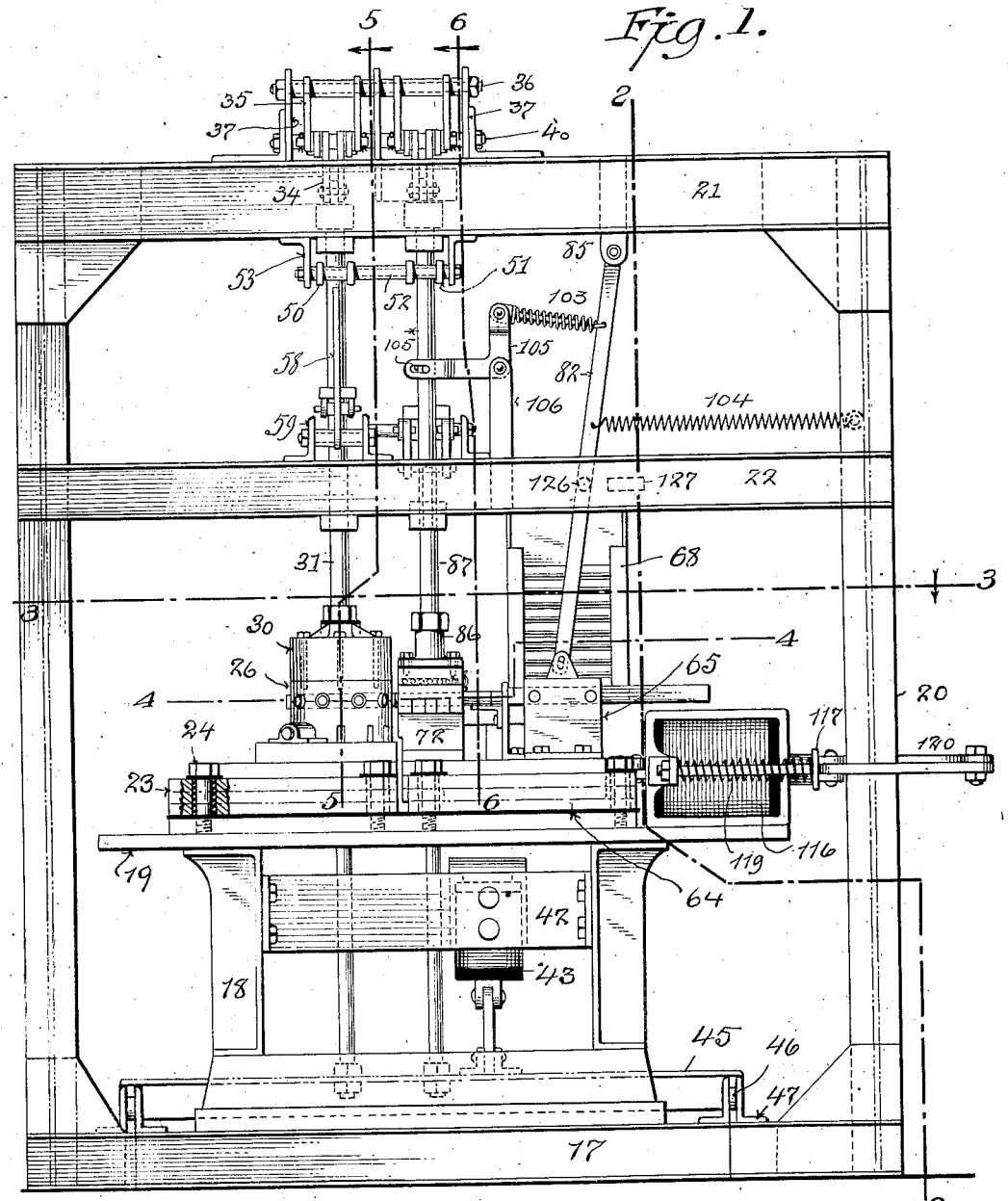

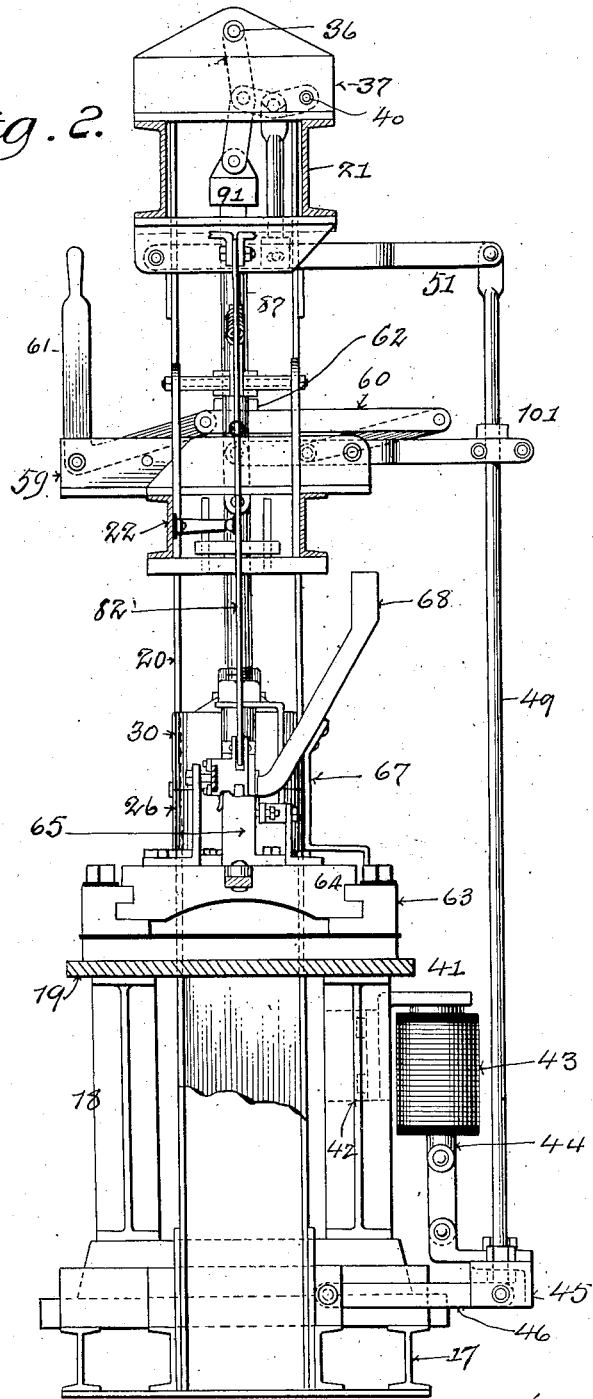

H. R. WOODROW & T. E. MURRAY.
APPARATUS FOR ELECTRIC WELDING.
APPLICATION FILED JAN. 12, 1916.
1,180,096.
Patented Apr. 18, 1916.
13 SHEETS—SHEET 3.
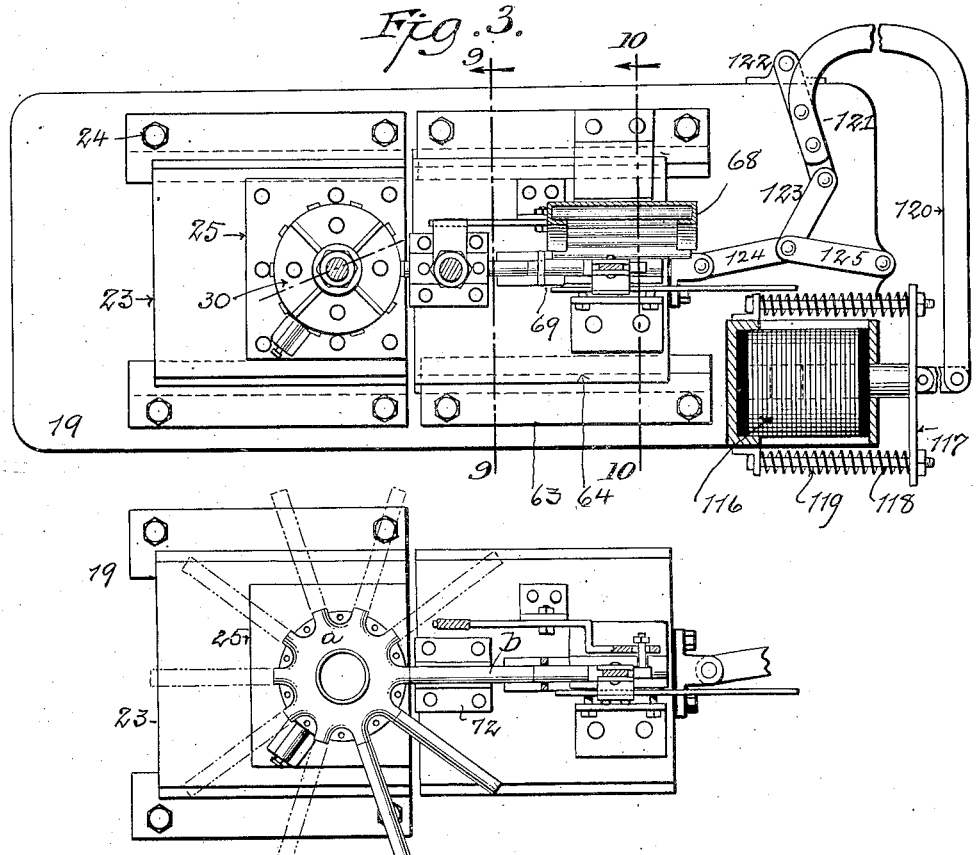
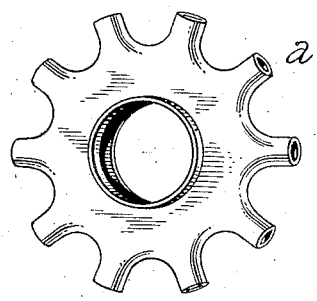
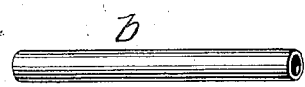
Inventors
Harry R. Woodrow
Thomas E. Murray
By their Attorney H. R. WOODROW & T. E. MURRAY.
APPARATUS FOR ELECTRIC WELDING.
APPLICATION FILED JAN. 12, 1916.
1,180,096.  Patented Apr. 18, 1916.
13 SHEETS—SHEET 4.
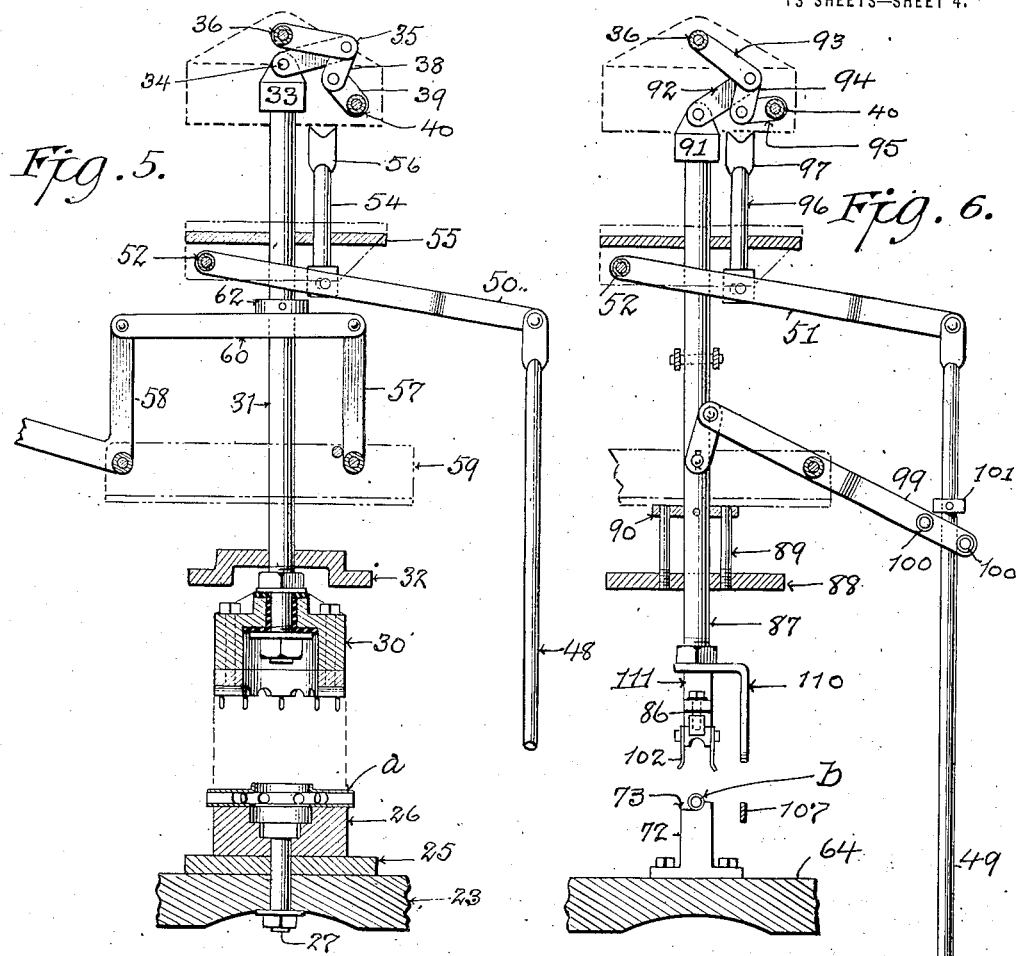
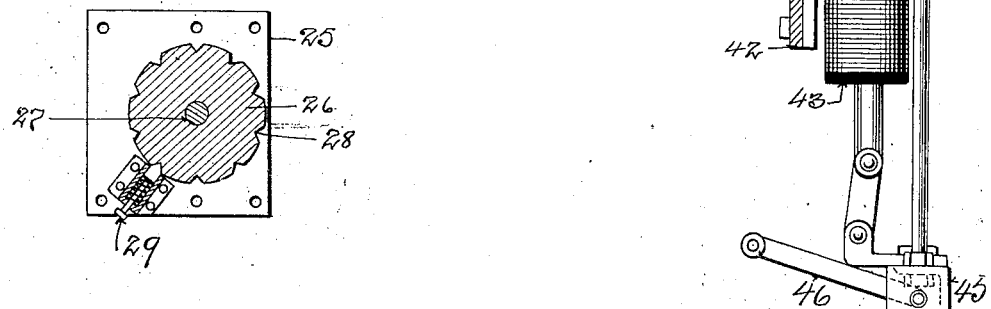
Inventors
Henry R. Woodrow
Thomas E. Murray
By their Attorney

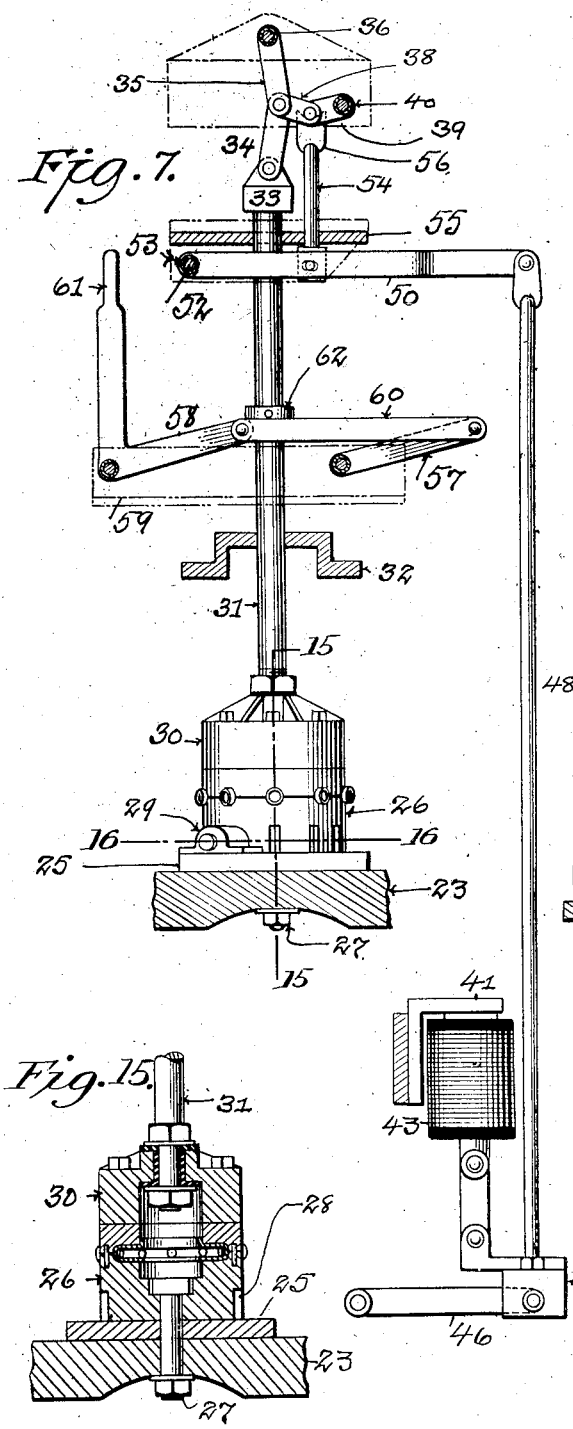
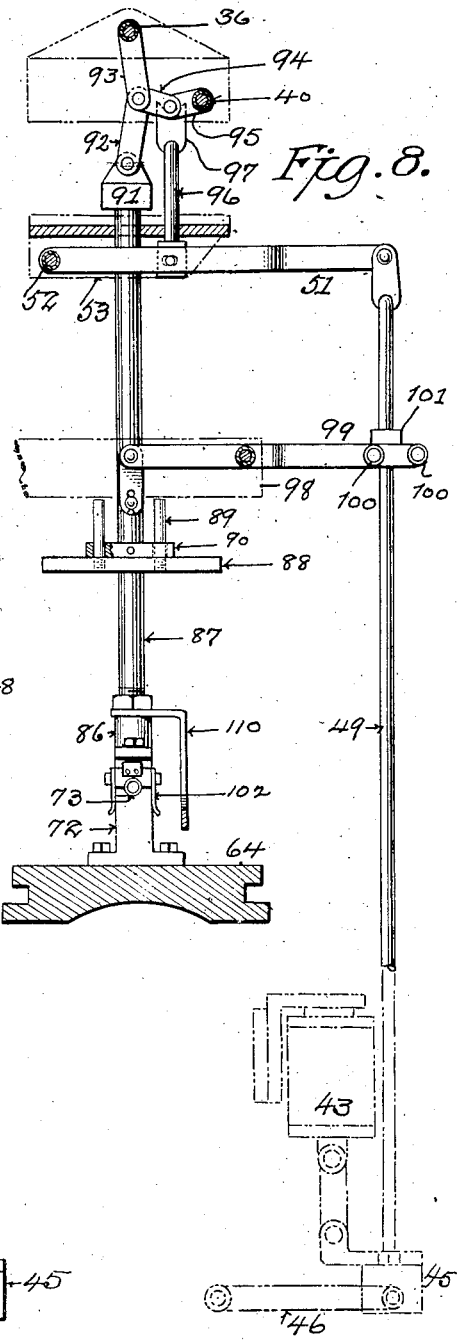
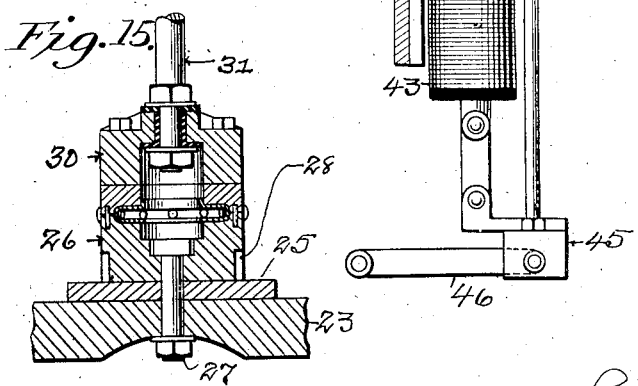

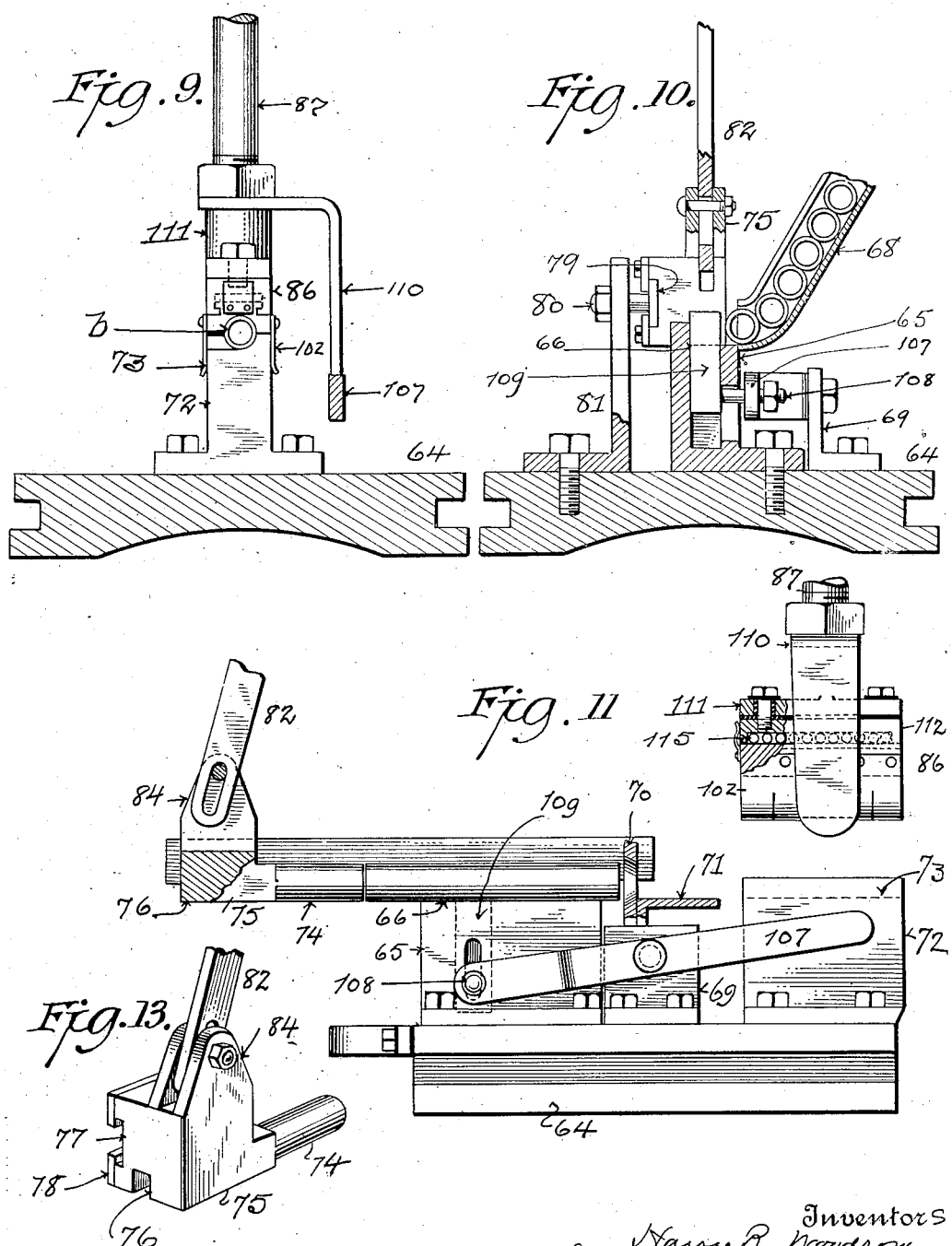

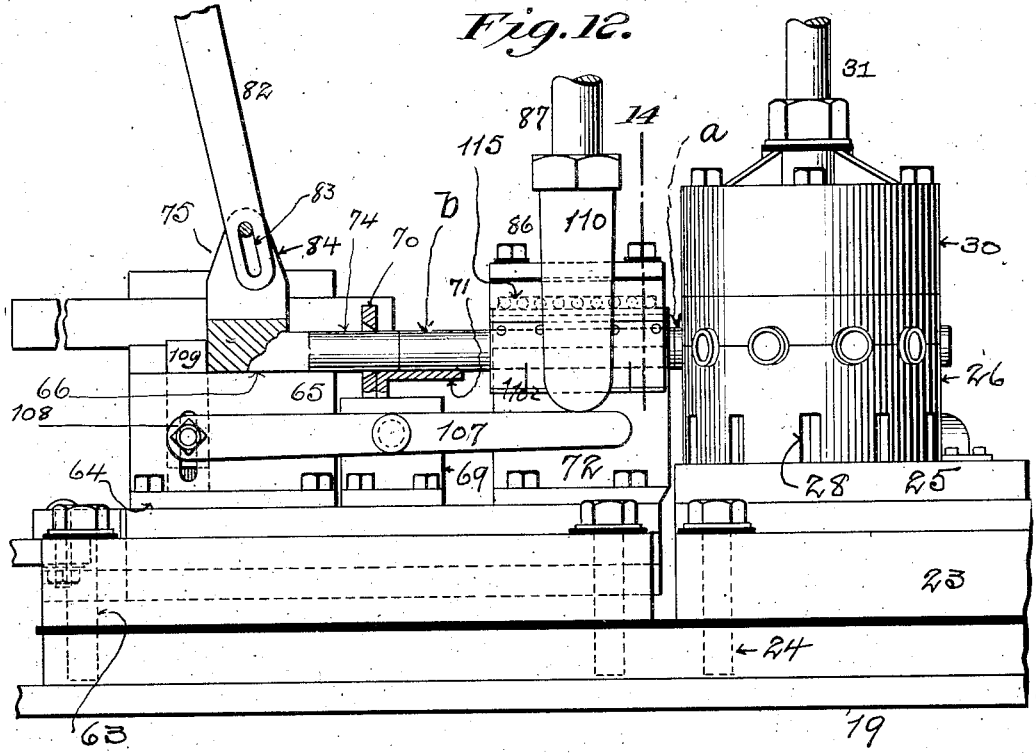
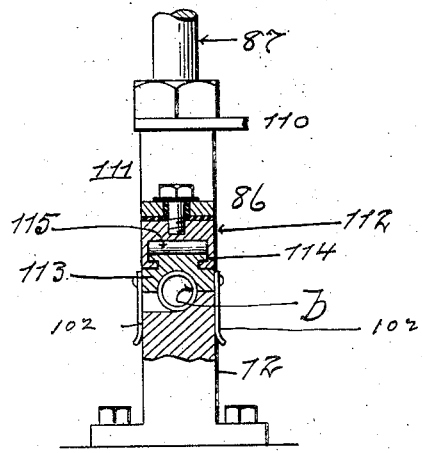

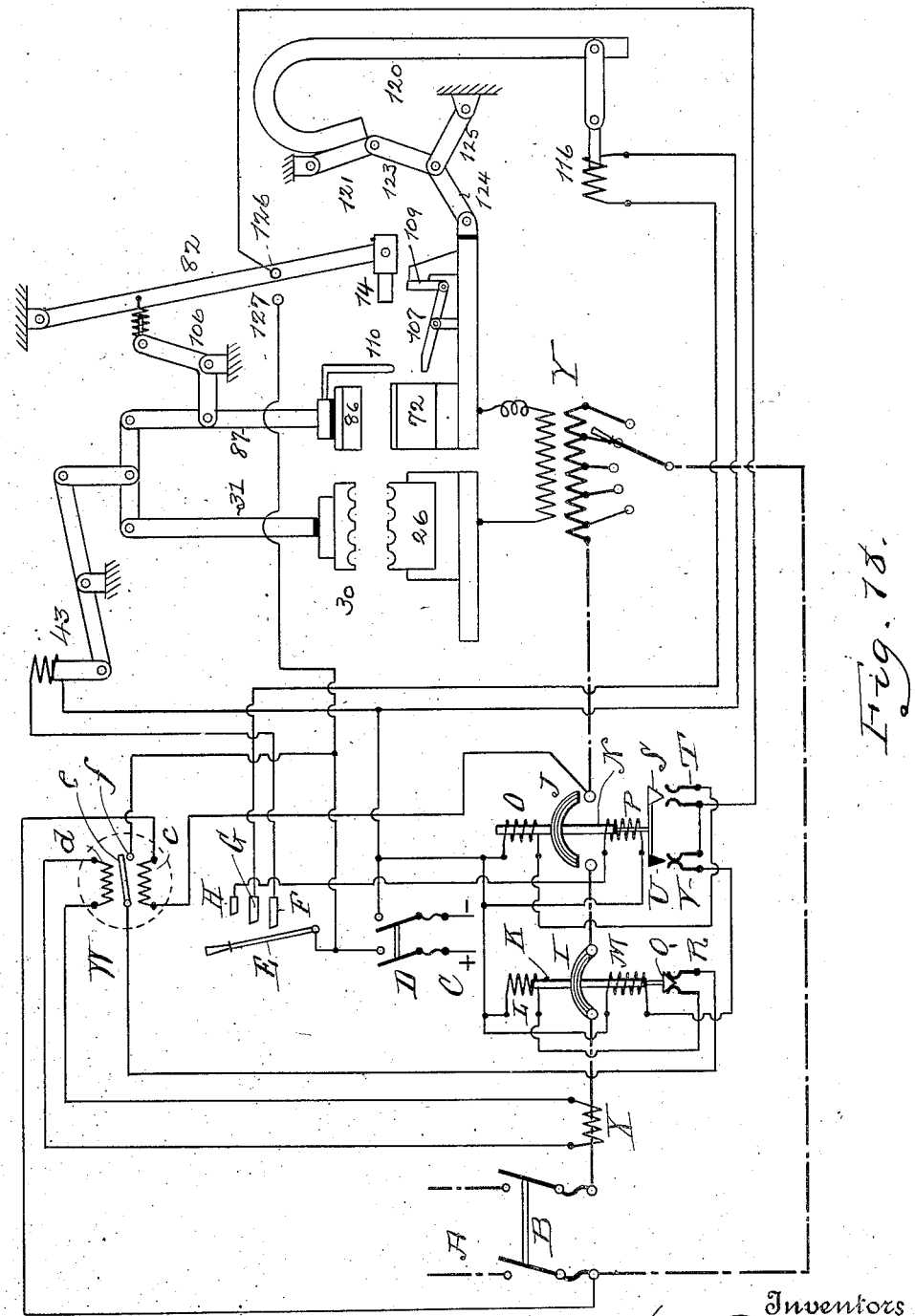

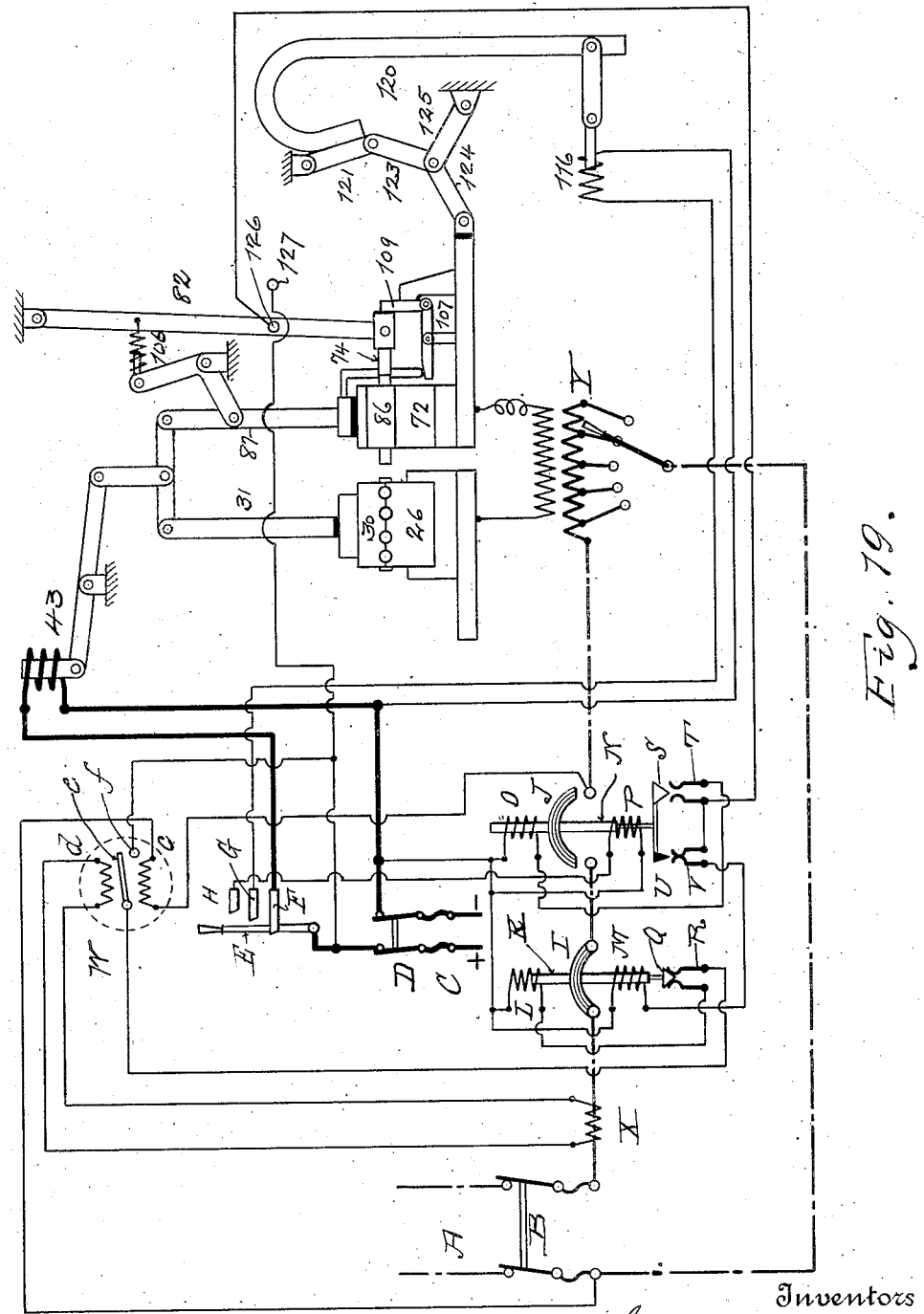

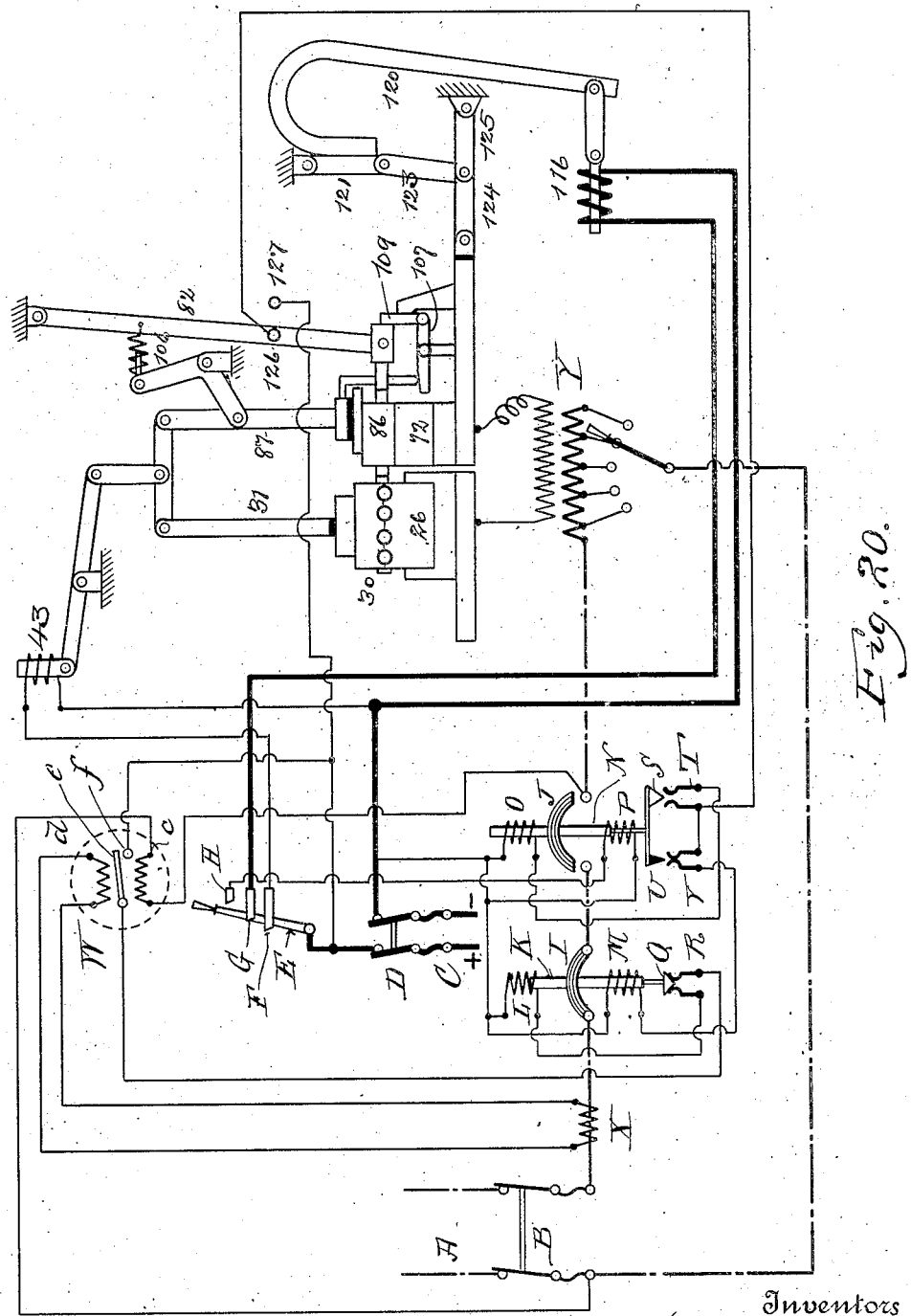

UNITED STATES PATENT OFFICE.

HARRY R. WOODROW AND THOMAS E. MURRAY, OF NEW YORK, N. Y.; SAID WOODROW ASSIGNOR TO SAID MURRAY.

APPARATUS FOR ELECTRIC WELDING.

1,180,096.          Specification of Letters Patent.          Patented Apr. 18, 1916.

Application filed January 12, 1916. Serial No. 71,616.

*To all whom it may concern:*

Be it known that we, HARRY R. WOODROW and THOMAS E. MURRAY, citizens of the United States, residing at New York, in the county of New York and State of New York, have invented a certain new and useful Improvement in Apparatus for Electric Welding, of which the following is a specification.

The invention is an apparatus for electric welding.

The machine here described illustrates an embodiment of our invention especially adapted to the welding of tubular metal spokes to spoke bases or tubular projections protruding radially from a hollow sheet metal hub. The hub is held and subjected to vertical pressure between suitable clamp members, which together form one electrode, with the spoke bases protruding beyond the periphery of said clamps. The spokes are placed parallel one above the other in an inclined chute or feed tray, down which they descend by gravity, so that each spoke in turn comes upon a shouldered block mounted upon a carriage movable toward said hub. A pushing device forces the spoke longitudinally between a second pair of clamp members, which together form the other electrode, and into contact with the presented spoke base on the hub, and a locking device behind the spoke comes into action to prevent retrogression of said spoke. A pressing mechanism acting on the carriage forces the spoke into close contact with the spoke base, and when the welding current passes, moves the spoke onward to take up the fused metal at the welding joint. After the weld is completed, the clamps are opened, the endwise presser device is relaxed, and the lower hub clamp member is rotated to move the attached spoke away from its holding means and to present a new spoke base for the next spoke, fed in like manner. After all the spokes are welded to the hub, the completed wheel body is removed.

The electric operating mechanism includes an electro-magnet for forcing down the upper hub and spoke clamp members, and a second electro-magnet for actuating the endwise presser mechanism. Alternating current is supplied to a transformer in circuit with the electrodes in order to effect the welding. Direct current from a separate source operates the electro-magnets. The circuits are controlled by a hand lever coöperating with three contact terminals, so that when circuit is established to the first terminal, the electro-magnet operating the vertically moving hub and spoke clamp members is energized; when established to the second terminal, the electro-magnet operating the endwise presser device is made active, and when established to the third terminal, circuit is closed from the alternating current mains to the transformer to make the weld. Upon the retraction of the said lever, the parts resume their normal position, so resetting the machine for a new operation.

The machine also includes means for automatically determining the duration, the period of passage of the welding current, and hence conditions the amount of energy delivered to the weld.

In the accompanying drawings—Figure 1 is a front elevation of our welding machine. Fig. 2 is a section on the line 2, 2 of Fig. 1. Fig. 3 is a section on the line 3, 3 of Fig. 1. Fig. 4 is a section on the line 4, 4 of Fig. 1. Fig. 5 is a section on the line 5, 5 of Fig. 1, the upper hub clamp 30 being raised. Fig. 6 is a section on the line 6, 6 of Fig. 1, the upper spoke clamp 30 being raised. Fig. 7 is also a section on the line 5, 5 of Fig. 1, the upper hub clamp 30 being lowered. Fig. 8 is also a section on the line 6, 6 of Fig. 1, the upper spoke clamp being lowered. Fig. 9 is a section on the line 9, 9 of Fig. 3. Fig. 10 is a section on the line 10, 10 of Fig. 3. Fig. 11 is an elevation of the spoke feeding device, showing the parts in initial position before the pusher operates to move the spoke into contact with the hub. Fig. 12 is a similar elevation of the spoke feeding device, showing the parts in position after the spoke has been moved into contact with the hub. Fig. 13 is a detailed view, showing the carrier of the spoke pusher 74 separately and in perspective. Fig. 14 is a section on the line 14, 14 of Fig. 12, showing details of construction of the upper spoke clamp 86. Fig. 15 is a section of the hub clamps on the line 15, 15 of Fig. 7. Fig. 16 is a section on line 16, 16 of Fig. 7. Fig. 17 shows the hub at $a$, and one of the spokes, separately, at $b$. Figs. 18 to 23, inclusive, are electrical diagrams, showing the circuits and controlling devices in the machine, and also the changes in said circuits at various stages of the operations.

Similar letters and numbers of reference indicate like parts.

We will first explain the mechanism and its operation, and then the various circuits and controlling devices coöperating therewith.

The bed of the machine is formed by four channel bars 17, Figs. 1 and 2, from which rise the standards 18 which support the table 19. Connected to said bed are the upright standards 20, which at their upper ends are united by girders 21, and at intermediate points by girders 22.

Upon the table 19 and insulated therefrom is a bed block 23, which is secured in place by insulated bolts 24, Figs. 3 and 12. Upon the block 23 is bolted a plate 25, Fig. 3, and upon said plate 25 is the lower cylindrical hub clamp plate member 26. There is a central recess in said clamp member 26, which communicates with an opening extending through plate 25 and table 19, in which opening is placed the pivot bolt 27, Figs. 5 and 15, the head of said bolt being in said recess, and the lower end of the bolt below table 19 being threaded to receive a nut. The upper surface of the lower clamp member 26 is suitably grooved and recessed to receive the hub, Fig. 17. In the outer periphery of clamp member 26 are notches 28, Figs. 12 and 16, adapted to receive the wedge-shaped end of a spring pin 29 held in a strap on plate 25. On withdrawing pin 29, the clamp member 26 may be manually rotated on its pivot to present the successive spoke bases $a$, Fig. 17, to the spokes $b$, and by permitting said pin 29 to engage the appropriate notch 28, said clamp member may be held in adjusted position.

The upper hub clamp member 30 has a central recess, in which the lower end of its operating rod 31 is secured. Said rod passes through an insulating bushing in said clamp member, and above said clamp member is shouldered so that said clamp member is secured to the rod by a nut within the recess, as shown in Fig. 5.

The rod 31 extends upwardly through an opening in a guide-bar 32 between girders 22, and has a head 33, Figs. 5 and 7, to which head are pivoted the arms 34 of a toggle. The other arms 35 of said toggle are pivoted on a rod 36 which extends between the brackets 37, Fig. 1, on top of girders 21. To the toggle joint is connected the arms 38 of a second toggle, the other arms 39 of which are pivoted to a rod 40 extending between said brackets 37.

Comparison of Figs. 5 and 7 will show that when hub clamp member 30 is in raised position, the arms of the two toggles are folded together, Fig. 5, and that when said clamp member is in lowered position both toggles are extended, Fig. 7, so that pressure acting upwardly on the joint of toggle 38, 39, tends to straighten said toggle, which in turn acting on the joint of toggle 34, 35, tends to straighten said last-named toggle, and so through the rod 31 to press clamp member 30 downward with increased force upon the hub, which is then seated partly in the grooves and recesses of lower clamp member 26, and partly in corresponding grooves and recesses on the under side of upper clamp member 30, the ends of the spoke bases $a$ protruding beyond the periphery of said clamping electrode formed by members 30 and 26.

We will now describe the mechanism whereby the upper clamp member 30 is permitted to descend, and whereby increased pressure, as set forth, is exerted on the hub through said toggles.

Secured upon an angle-bar 41, Figs. 1, 2, bolted to a flanged cross-bar 42 on standards 18, is an electro-magnet 43, having a plunger armature 44 which is linked to a bar 45, carried by arms 46, pivoted in brackets 47, Fig. 1, on base girders 17. To said bar are connected the lower ends of two parallel upwardly extending rods 48, 49.

To the upper end of rod 48, Figs. 5 and 7, is connected the end of a forked lever 50. To the upper end of rod 49 is connected the end of a forked lever 51. The forked ends of said levers are pivoted upon a rod 52 held in brackets 53 on the under side of top girders 21, Fig. 1. Between the arms of forked lever 50 is pivoted a vertical rod 54 which extends upwardly through an opening in a guide-plate 55 on the under side of top girders 21, and terminates in a crotched head 56, the concavity of which comes directly below the joint between toggle arms 38, 39.

In Fig. 5 the clamp member 30 is shown in raised position, and is so normally maintained by means of a lever 57 and bell crank lever 58 pivoted between brackets 59, supported on the intermediate girders 22, Fig. 1. One arm of bell crank lever 58 is connected by a link 60 to lever 57, and the other arm has a handle 61, Fig. 7. A collar 62 on rod 31 rests upon link 60. Hence when the handle 61 is pushed downwardly, the link 60 raises the rod 31, as shown in Fig. 5, and when the handle 61 is raised, the rod 31 falls, and clamp member 30 descends by gravity, upon the hub previously placed in the lower clamp member 26. From Fig. 5 it will be seen that when the clamp member 30 is in raised position, the crotched head 56 is considerably below the joint between the arms of toggle 38, 39. When, however, clamp member 30 has descended, as shown in Fig. 7, then the said toggle joint lies in the concavity of crotched head 56. When electromagnet 43 raises rod 48, said crotched head meets said joint, and the pressure is transmitted through the two toggles, as already explained, to force clamp member 30 down upon the hub with greatly increased pressure. The hub is now tightly clamped in one of the clamping electrodes, and is ready to receive a spoke.

On the table 19 are secured guide-ways 63, Fig. 2, which receive a movable carriage 64, Figs. 2, 3, 8, 9, 10, 11. Bolted upon said carriage is a casting 65 having a shoulder 66 on its upper side, Fig. 10. Supported by a bracket 67, Fig. 2, is an inclined chute or feed tray 68, in which the spokes b are placed, one above the other, as best shown in Fig. 10. The lowest spoke slides by gravity sidewise from the chute to the upper surface of the casting 65, where it is retained by the shoulder 66, Fig. 11. Also bolted to the carriage 64 is a block 69, which carries a guide ring 70, Figs. 11 and 12, which ring comes just in front of the end of the spoke, when it rests on casting 65, and which is outwardly flared on the side facing said spoke end. Also carried by the block 69 and on the other side of ring 70 is a supporting ledge 71. Bolted to the carriage 64 is the lower spoke clamp member 72, the upper side of which is shouldered, as shown at 73. The bottom of the shoulder 66 on casting 65, the ledge 71 and the bottom of the shoulder 73 on clamp member 72 are in line, so that the spoke may be moved longitudinally over the top of casting 65, through the guide ring 70, over the ledge 71, and upon the shoulder 73 on clamp member 72; or, in other words, the spoke may be moved from the position shown in Fig. 11, to the position shown in Fig. 12. When the spoke reaches the end of its sliding movement, its extremity abuts against the end of one of the spoke bases a, which protrudes from the hub clamp, as shown in Fig. 12.

The sliding forward of the spoke, above described, is effected by the following mechanism: A pusher 74, Figs. 11, 12, 13, of the same diameter as the spoke, is preferably integrally formed with a carrier 75, Fig. 13. The lower side of said carrier is channeled at 76, to receive the protruding upper edge of casting 65, Fig. 10. One side of the carrier has a longitudinal recess 77, Fig. 13, over the edges of which overlap two plates 78, bolted to said side. Entering said recess and retained therein by said plates is a plate 79 supported on a pin 80 which extends through a flanged plate 81 which is bolted to the carriage 64 alongside of the casting 65. The carrier 75 is, therefore, supported and guided by both the fixed plate 79 and the upper edge of casting 65, and the pusher 74 is thus kept in alinement with the spoke, which it feeds forward to the spoke base, as above described.

Motion is imparted to the carrier by means of a swinging bar 82, Figs. 1, 2, 11 and 12, having at its lower end a slot 83, which receives a pin extending between lugs 84 on the upper side of the carrier, Fig. 13. Said bar is pivoted at its upper end to a lug 85, Fig. 1, depending from one of the top girders 21. The mode of operating this bar will be described further on, after the mechanism for raising and lowering the upper spoke clamp member 86 has been explained. Said member 86 is disposed directly above lower spoke clamp member 72, and has certain details of construction, the explanation of which is also deferred until the raising and lowering devices for said member 86 are described.

Clamp member 86 is carried by a rod 87, Figs. 6, 7, 9, which extends upwardly through the plate 88, upon which rod are two vertical pins 89. Fast on the rod 87 is a cross bar 90 having openings to receive said pins which serve to guide said rod, Figs. 6 and 8. Rod 87 has a crotched head 91 similar to head 33 on rod 31, and this head is connected to a toggle mechanism, similar to that already described in connection with head 33: that is to say, the head 91 is connected to arms 92 which are jointed to arms 93, which arms 93 are carried by the rod 36. The joint between arms 92, 93 is pivoted to arm 94 which is jointed to an arm 95 carried by rod 40. The bifurcated lever 51 connected to rod 49 has pivoted between its arms the rod 96 having a crotched head 97, the concavity of which comes directly below the joint between toggle arms 94, 95.

Fulcrumed on a bracket 98 supported on girders 22 is a lever 99, Figs. 6 and 8. One end of this lever is linked to rod 87. The other end is bifurcated and carries two rollers 100, between which the rod 49 passes. On rod 49, above these rollers, is a collar 101. Fig. 6 shows the rod 49, and hence the spoke clamp member 86 in raised position, corresponding to the raised position of the hub clamp member 30 in Fig. 5. The rod 87 cannot descend because the bifurcated end of lever 99 is locked under the collar 101 on rod 49. The same operation, however, of the electro-magnet 43 which raises rod 31 also raises rod 49, since both ends are connected to the same cross bar 45, to which the magnet armature is attached. But on the raising of rod 49, the collar 101 thereon is also lifted, so permitting rod 87 to go down. The toggles 92, 93 and 94, 95 now change from the position shown in Fig. 6 to that shown in Fig. 8, and the joint of toggle 94, 95 comes into the cavity of crotched head 97. Meanwhile grooves on the under side of clamp member 86 receive the spoke, and leaf springs 102 on the sides of said member slide over the sides of the lower clamp member 72. The magnet 43 produces upward pressure on said toggle joint, which, being transmitted, results in increased downward pressure by clamp member 86 upon the spoke. Thus the final increased pressure exerted by magnet 43 is delivered to both the hub and the spoke at the same time, while said hub and spoke are in their closed clamping electrodes.

For the sake of consecutive description, we have explained the operation of the upper spoke clamp member 86 before showing how the pusher 74 gets the spoke b into position under said member. We, therefore, return to the swinging bar 82 which we have already stated to be pivoted at its upper end to lug 85, depending from one of the top girders 21, and at its lower end to the pusher carrier 75 (Fig. 10). Connected to said bar are two opposed helical springs 103 and 104. Spring 104 is attached to one of the upright girders 20, and spring 103 to the vertical arm of a bell crank lever 105, Fig. 1, pivoted in a standard 106 on the girders 22. The horizontal arm of said bell crank lever is slotted near its end to receive a pin 105* Fig. 1, on rod 87. Hence when said rod begins to descend and bring down upper spoke clamp 86, the bar 82 is moved in suitable direction to cause the carrier 75 and pusher 74 to move to the right of Fig. 11, and to continue so moving until, as shown in Fig. 12, the end of the spoke is brought into contact with the spoke base a on the hub. The pin and slot connection between lever 105 and rod 87 gives sufficient lost motion to permit the feeding of the shaft into position to be completed before the spoke is clamped. The hub and the spoke now being placed in butt contact and both subjected to the heavy vertical increased pressure due to the toggles, it is necessary that the butt joint be also subjected to very heavy pressure by forcing the spoke longitudinally against said spoke base. To this end a movable abutment is first moved into place directly behind the rear end of the spoke. This is done as follows (Figs. 10, 11, 12): On the block 69 is a pivoted lever 107, one arm of which carries a pin 108, which extends through a vertical slot communicating with a recess in casting 66, in which recess is a vertically movable locking block 109. On rod 87 which carries clamp member 86 and just above said member is secured a depending arm 110. This arm, before said clamp member reaches the spoke, strikes the free arm of lever 107, depresses said arm, and so causes the locking block 109 to rise up behind the spoke, as shown in Fig. 12. The block 109 prevents any slipping of the spoke in its clamping electrode when the welding pressure is applied.

Before describing the pressing mechanism which acts on the joint between spoke and hub, it is necessary to note the details of construction of the upper spoke clamp member 86. Obviously, if the spoke were held between the clamp members and at the same time subjected to heavy vertical pressure it would be difficult afterward to force it in a longitudinal direction against the spoke base on the hub. Therefore, the lower portion of said upper spoke clamp member is made slidable with said spoke in the following way: The clamp member is secured by insulated bolts to a head 111, Fig. 9, having flanges and attached to the lower end of rod 87. Said clamp member is made in two parts—Figs. 11, 12, 14—namely, an upper portion 112, bolted to head 111, having a recess undercut on its longitudinal sides, and a lower sliding block 113, in which is made the spoke-receiving groove, and which is provided with a rib 114 which partly fills said recess. Above the rib and in the recess are friction rollers 115. Hence any pressure exerted on the rear end of the spoke tending to force it toward the spoke base on the hub, causes the sliding block 113 to move in the same direction, the spoke on its lower side, of course, sliding over the upper surface of lower clamp member 72.

On the table 19 is secured a horizontal electro-magnet 116, Fig. 3, having a plunger armature carrying a cross-bar 117, having opening to receive guide-rods 118 and normally set out by helical springs 119. Said armature is jointed to one end of a curved bar 120, the other end of said bar being riveted to one arm 121 of a toggle. The arm 121 is pivoted in a lug 122 on table 19, and is jointed to the other toggle arm 123. The end of arm 123 is pivoted to the joint of a toggle having arms 124, 125, arm 125 being pivoted to the table 19, and arm 124 being pivoted in lugs on the carriage 64. Hence when the magnet 116 draws in its armature, the curved arm 124 is moved in a direction to straighten the toggle 121, 123, and this toggle in turn operates to straighten toggle 124, 125, thus causing greatly increased pressure to be exerted on carriage 64, which transmits said pressure to the butt contact between spoke b and spoke base a on the hub.

The welding current now passes between the electrodes, namely, the hub clamp and the spoke clamp, and so to said butt contact between the bodies to be welded. When the weld is made, magnet 116 releases its armature, which is retracted by helical springs 119, so breaking the toggles and withdrawing the carriage 64. Magnet 43 in turn releases its armature, allowing bar 45 to fall, so carrying down rod 49, so that the collar 101 on said rod, acting on lever 99, raises rod 87, and so lifts upper spoke clamp member 86, which in rising breaks toggles 92, 93 and 94, 95. Rod 48 goes down, of course, at the same time, thus withdrawing the crotched head 56 from its proximity to the joint of toggle 38, 39. The handle 61 can then be moved down by the operator to raise link 60, and so to lift the upper hub clamp member 30. Lastly, the manual rotation of lower hub clamp 26 to bring a new base into alinement with the spoke advancing mechanism, completes the sequence of mechanical operations.

*The electric circuits and instrumentalities.*—We will now describe the electric circuits of the apparatus and the various instrumentalities included therein.

One terminal of the secondary of transformer Y is to be connected to plate 25, carrying lower hub clamp member 26. When the upper clamp member 30, which is insulated from its supporting rod 31, descends, the two clamp members 30 and 26 are in electrical contact with the hub, and form one electrode. The other terminal of the transformer secondary is to be connected to the carriage 64, which is insulated from the table 19, and is, therefore, in electrical connection with lower spoke clamp member 72. The upper portion 112 of the upper spoke clamp member 86 is insulated from the head 111 attached to rod 87, Fig. 11. Between the lower sliding block 113 of said member 86 and the lower clamp member 72, electrical connection is made when said clamps are together, by means of the depending leaf springs 102, Fig. 14, the two spoke clamp members being thus electrically connected and in electrical contact with the spoke, form the other electrode; so that the welding current passes between the said electrodes, through the hub and spoke, and hence through the joint to be welded between them.

From the foregoing description it will be apparent that there are three electrical epochs, so to speak, which occur successively; first, the energizing of electromagnet 43, to control the descent of the upper hub and spoke clamp members, and to exert the increased vertical pressure on the bodies to be welded—second, the energizing of electro-magnet 116, whereby the increased endwise pressure is exerted on the joint between spoke and spoke base, and third, the passing of the welding current. In addition, we have provided automatic means for regulating the duration of said welding current.

We now refer to the electrical diagrams, Figs. 18 to 23, inclusive, wherein the mechanism is shown in simplified form.

At A are the terminals of alternating current mains, which coöperate with the switch B. At C are terminals of direct current leads, which coöperate with the switch D. At E is a hand controller lever, and three terminal contacts F, G, H, so disposed that said lever closes circuit first with contact F, then with contacts F, G, and then with contacts F, G, H. At I and J are two switches. Switch I is supported on the plunger armature K, which enters coils L, M disposed respectively above and below said switch. Switch J is supported on the plunger armature N, which enters coils O, P disposed respectively above and below said switch. The armature K carries a conducting plug Q which is received between a pair R of normally separated contacts. The armature N carries a cross-bar, on which is a conducting plug S which is received between a pair T of normally separated contacts, and a plug U of insulating material which is received between a pair V of normally closed spring contacts. W is a wattmeter relay, of which $c$ is the potential coil and $d$ the current coil, said current coil being connected to the secondary of a current transformer X. The moving member $e$ of said relay coöperates with circuit terminal $f$. The period of movement of said moving member may be regulated by any suitable means—not here shown—so that a predetermined interval of time shall elapse between the instant when the relay is energized and the member begins to move and the instant when the member meets terminal $f$. Transformer Y is preferably provided with means for cutting in or out sections of the primary. The swinging arm 82 carries a pin 126, which pin, when the arm is being retracted by helical spring 104, Fig. 1, closes contact momentarily with a spring 127 mounted on one of the girders 22.

In Fig. 18 the various circuits and parts are shown in position ready for operation.

The operator raises handle 61, Fig. 7, thus lowering link 60 to permit the upper spoke clamp member 30 to descend, closes switches B and D, and moves controller lever E to close circuit at contact F. The result is shown in Fig. 19, in heavy lines. That is to say, direct current circuit is closed through magnet 43, which attracts its armature. The hub clamp member 30 and spoke clamp member 86 descend, the spoke is fed into proper position, as already described, and the magnet pull exerted through the toggles produces the desired increased pressure laterally upon the bodies to be welded. The operator next moves controller lever E to close circuit at contacts F and G. The result is shown in heavy lines in Fig. 20. Magnet 116 being energized, moves the carriage 64, as already explained, to force the end of the spoke with increased pressure against the spoke base on the hub.

The operator moves the lever D to close contact at F, G and H. The result is shown in Fig. 21, active circuits, as before, being shown in heavy lines. The switch J is closed, because coil P is energized to move armature N downwardly. The circuit continues from magnet coil P, to wire $g$, and so to the negative terminal at switch D. The alternating current from closed switch B now passes to the primary of transformer Y, and the induced current on the secondary passing through the joint between spoke and spoke base effects the weld at said joint. The current transformer X energizes the current coil $d$ of the wattmeter relay W through wires $h$, heavy dotted lines. The potential coil $c$ of said relay is at the same time energized by current taken across the line from one contact of switch J, through wire $i$, (heavy dotted lines), to one terminal of switch B.

The moving member $e$ of wattmeter relay W is thus moved into contact with terminal $f$. The period of time occupied by the moving member to effect this closing of the circuit is to be regulated, as already stated, by any suitable means (not here shown) and determines the length of time of passage of the welding current. Such means, for example, is shown and described in the application of Harry R. Woodrow, Serial No. 61,864, filed November 17, 1915. This length of time will be governed by the conditions of the weld—such as cross sectional area of the joint, etc., and will be so chosen as to permit a predetermined amount of energy to pass to the weld, and sufficient to insure perfect welding.

Figure 22:
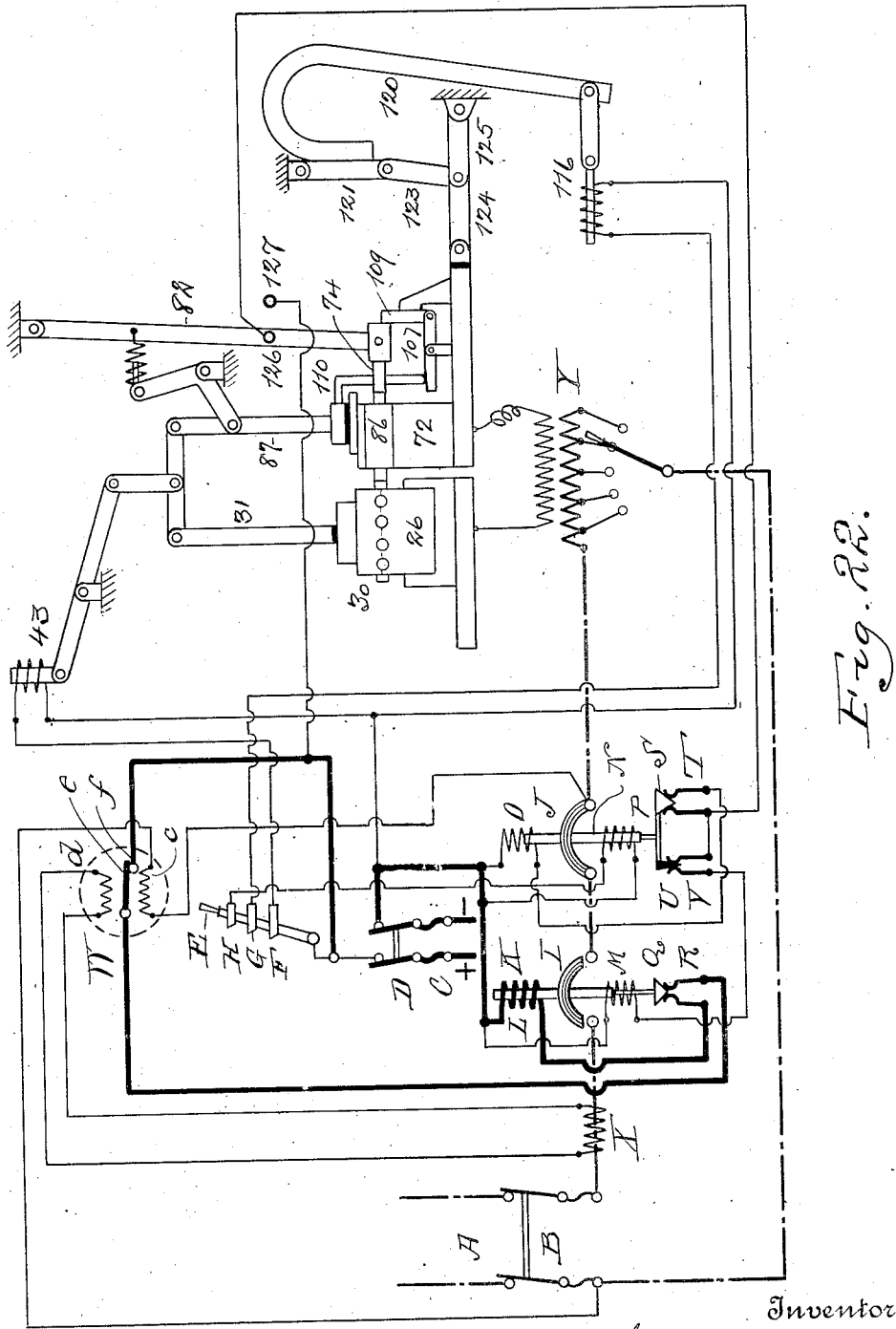

The result of closing the circuit by the wattmeter relay is shown in Fig. 22 in heavy black lines. The current from the positive terminal of switch D proceeds through the moving member $e$ of relay W, to contacts R, between which circuit is closed by plug Q, and so through a coil L, to the negative terminal of said switch. The coil L, being thus energized, lifts switch I sufficiently to break circuit to transformer Y, without withdrawing plug Q from between contacts R. Circuit from switch B to the transformer is broken, and the welding current ceases.

Figure 23:
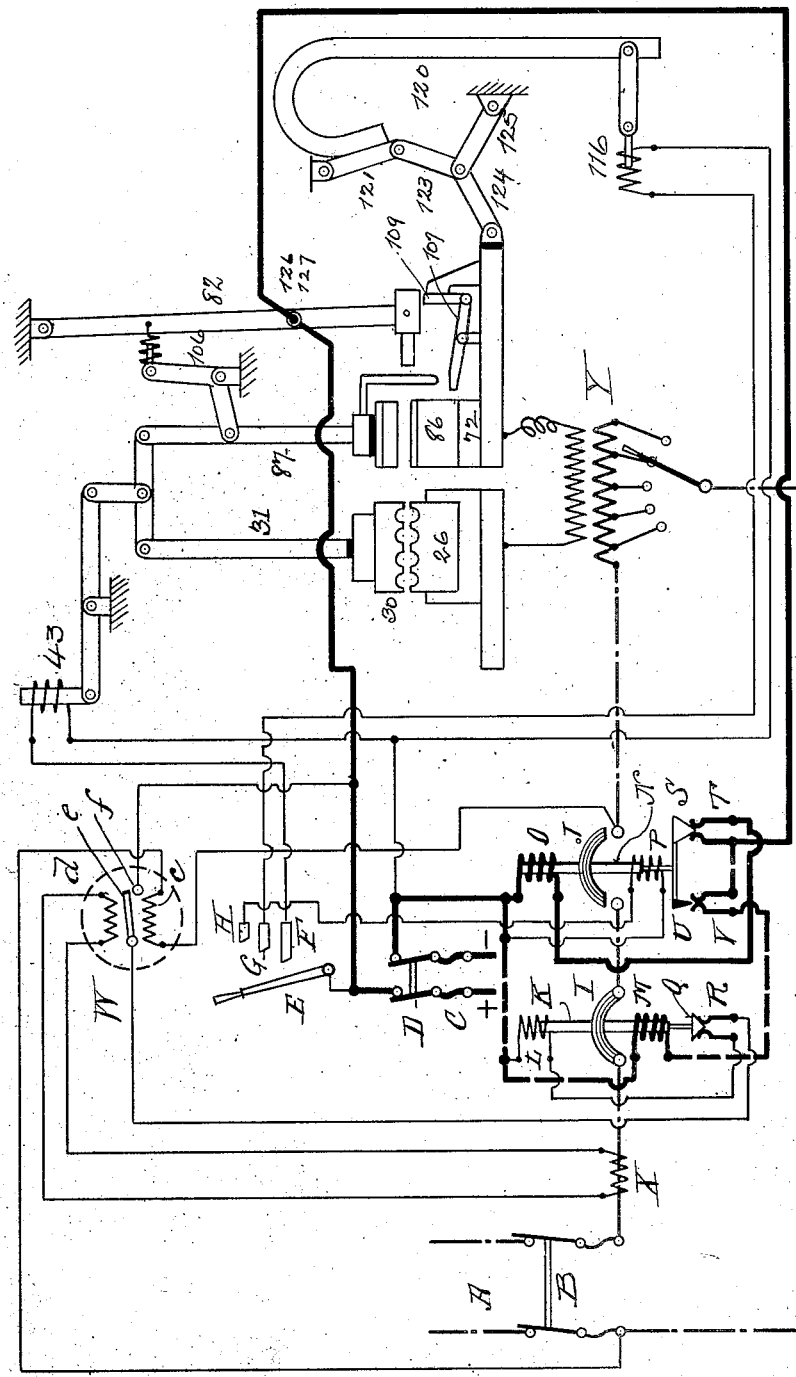

To restore all parts to normal position, the operator moves the controller lever E away from contacts F, G, H. The result is shown in Fig. 23. It has already been explained that when the upper spoke clamp member 86 is moved down, the bell crank lever 105 moves the swinging arm 82 to the left of Fig. 1. When member 86 rises, the arm 82 is swung to the right of Fig. 1 by the action of its retracting spring 104. While arm 82 is swinging to the right, and before it reaches the end of its path of movement, the pin 126 thereon meets the spring contact 127, mounted on and insulated from one of the girders 22. The conditions at this moment are shown in Fig. 23. The circuit (heavy black lines) proceeds from the positive terminal of switch D to contacts R, from between which the plug S is rising, circuit still being closed between said contacts R, to coil O, and so to the negative terminal of switch D. The plug U has moved out from between contacts V, thus closing circuit through coil M, to said switch terminal. Switch J is, therefore, opening and switch I is closed. By the time the swinging arm 82 has cleared the spring contact 127, the plug S will be lifted out of the contacts T, and all the parts will be re-set in the position as shown in Fig. 18.

The time required for closing the control lever E from one contact F, G or H to the next may be about 1/10 of a second, which is sufficient to give the proper sequence of operations.

We claim:

1. An apparatus for electric welding, comprising an electrode for one of the bodies to be welded having a fixed member and a movable member, the said members forming a clamp, means for closing said clamp, means automatically operating after the closing of said clamp for actuating said movable member to apply increased pressure to said body, and means for moving the other of said bodies into welding contact with said first-named body.

2. An apparatus for electric welding, comprising an electrode for one of the bodies to be welded having a fixed member and a movable member, the said members forming a clamp, means for closing said clamp, electrically actuated means automatically operating after the closing of said clamp for actuating said movable member to apply increased pressure to said body, and means for moving the other of said bodies into welding contact with said first-named body.

3. An apparatus for electric welding, comprising a clamping electrode for one of the bodies to be welded, having a fixed member and a movable member means for moving said movable member to clamp said body between said movable member and said fixed member, an electromagnet, and transmitting mechanism connected to the armature of said magnet and to said movable member; whereby after said movable member shall have clamped said body, said magnet shall actuate said movable member to exert increased pressure upon said body.

4. An apparatus for electric welding, comprising a clamping electrode for one of the bodies to be welded, having a fixed member and a movable member, a rod supporting said movable member, a manually operable device engaging said rod for retaining said rod in raised position and permitting said rod to descend by gravity when released, and an electrically controlled presser mechanism coöperating with said rod after said clamp member thereon has made contact with said body to press said member upon said body.

5. An apparatus for electric welding, comprising a clamping electrode for one of the bodies to be welded, having a fixed member and a movable member, a rod supporting said movable member, a fixed support, a toggle mechanism connected to the upper end of said rod and to said support, a manually operable device engaging said rod for retaining said rod in raised position and permitting said rod to descend by gravity when released, thereby increasing the angle between said toggle arms, a member bearing on the toggle joint, an electro-magnet, and transmitting mechanism connected to the armature of said magnet and said movable member: whereby after said movable clamp member has made contact with said body, said electro-magnet being energized shall actuate said member bearing on said toggle joint to straighten said toggle joint and thereby press said upper clamp member upon said body.

6. An apparatus for electric welding, comprising a clamping electrode for one of the bodies to be welded, having a fixed member and a movable member, a rod supporting said movable member, a fixed support, a toggle mechanism connected to the upper end of said rod and to said support, a manually operable device engaging said rod for retaining said rod thereon in raised position and permitting said rod to descend by gravity when released, thereby increasing the angle between said toggle arms, a pivoted lever, a rod pivoted on said lever and having a crotched end receiving the toggle joint in its concavity, an electro-magnet; and transmitting mechanism connected to the armature of said electro-magnet and to said lever: whereby after said movable clamp member has made contact with said body, said electro-magnet being energized shall actuate said crotched rod to straighten said toggle joint and thereby press said upper clamp member upon said body.

7. An apparatus for electric welding, comprising a clamping electrode for each of the bodies to be welded, each electrode having a lower fixed member and an upper movable member, and electrically actuated means for controlling the descent by gravity of said movable members upon said bodies.

8. An apparatus for electric welding, comprising a clamping electrode for each of the bodies to be welded, each electrode having a lower fixed member and an upper movable member, and electrically actuated means for first controlling the descent by gravity of said movable members upon said bodies, and then causing said movable members to exert increased pressure upon said bodies.

9. An apparatus for electric welding, comprising a clamping electrode for each of the bodies to be welded, each electrode having a fixed member and a movable member, means for moving said movable members to clamp said bodies between said movable members and said fixed members, and means automatically operating after said movable members shall have clamped said bodies for actuating said movable members simultaneously to apply increased pressure to said bodies.

10. An apparatus for electric welding, comprising a clamping electrode for each of the bodies to be welded, each electrode having a lower fixed member and an upper movable member, rods 31, 87 supporting said movable members, a manually operable device engaging rod 31 for retaining said rod in raised position, a pivoted lever having one arm connected to rod 87 and having its other arm bifurcated, an electro-magnet, a vertically movable rod connected to the armature of said magnet and entering between the bifurcations of said lever arm, and a collar on said rod 87 above said lever arm: whereby when said magnet is energized, said collar is raised to permit the descent of rod 87 coincidently with the descent of rod 31 due to the release of said manually operable device, thereby causing said upper clamp members to bear upon said bodies.

11. An apparatus for electric welding, comprising a clamping electrode for holding in fixed position one of the bodies to be welded, a second clamping electrode for holding the other of said bodies, means for feeding said last-named body into said second clamping electrode to make contact with said first-named body, and a locking device for preventing retrogression of said body from said electrode.

12. An apparatus for electric welding, comprising a clamping electrode for holding in fixed position one of the bodies to be welded, a second clamping electrode for holding the other of said bodies, means for feeding said last-named body into said second clamping electrode to make contact with said first-named body, a locking device for preventing retrogression of said fed in body from said electrode, and means for operating said locking device by the descent of the movable member of said electrode.

13. An apparatus for electric welding, comprising a clamping electrode for holding in fixed position one of the bodies to be welded, a second clamping electrode for holding the other of said bodies, a support for said last-named body in front of said second electrode, means for moving said body along said support and into said second electrode to make contact with said first-named body, and a locking device in said support and engaging the rear side of said body after said contact has been made.

14. An apparatus for electric welding, comprising a clamping electrode for holding in fixed position one of the bodies to be welded, a second clamping electrode for holding the other of said bodies, a support in front of said second electrode, means for delivering a plurality of bodies successively to said support, and means for moving each of said delivered bodies in turn into said second electrode.

15. An apparatus for electric welding, comprising a clamping electrode for each of the bodies to be welded, each electrode having a fixed member and a movable member, means for operating the movable member of one of said electrodes to clamp one of said bodies in welding position, means for feeding the other of said bodies into said second electrode into contact with said first-named body, means for operating the movable member of said second electrode to clamp said fed-in body, and transmitting mechanism connected to said operating means for operating said feeding means.

16. An apparatus for electric welding, comprising means for exerting lateral pressure on each of two juxtaposed bodies to be welded, means for moving said bodies into contact, means for establishing welding current at the joint between said bodies, and electrically actuated means operating after said bodies have made contact for subjecting said joint to increased pressure for pressing said bodies together to take up fused metal at said joint.

17. An apparatus for electric welding, comprising a clamping electrode for each of the bodies to be welded, one of said electrodes being fixed, a carriage supporting the movable electrode, an electro-magnet, and toggle mechanism connected to said carriage and to the armature of said magnet, whereby after said carriage has been moved to bring said bodies into contact, said magnet is operated to apply increased pressure at the joint.

18. An apparatus for electric welding, comprising a lower clamp and a vertically moving upper clamp for holding one of the bodies to be welded, a lower clamp and a vertically moving upper clamp for holding the other of said bodies, the last-named upper clamp having on its lower surface a sliding member bearing on said last-named body, a movable carriage supporting said last-named lower clamp, means for moving downwardly said upper clamp to press upon said bodies, and means for operating said carriage to press the said bodies together.

19. An apparatus for electric welding, comprising clamping electrodes, each having an upper and a lower member, one of said electrodes having on one of its members a sliding face block bearing upon the body clamped between said members, and pushing mechanism operating upon said body to cause the same to slide upon the surface of one of said members and to move conjointly with said sliding face block of the other member: whereby said body while clamped between the members of one electrode may be moved into welding contact with the body clamped in the other electrode.

20. An apparatus for electrically welding wheel spokes to a hub, an electrode for clamping the hub with its circumferential periphery exposed, an electrode for clamping the spoke to be welded to said hub periphery, an inclined chute receiving a plurality of spokes disposed laterally parallel one above the other, a shouldered support receiving said spokes from said chute, a pusher mechanism on said support for moving said spokes in a longitudinal direction into said spoke clamping electrode to make butt contact with said hub periphery, and a vertically moving locking block disposed in said support and moved into position behind said spoke after the entrance of said spoke into said spoke clamping electrode.

21. An electrically operated apparatus for electric welding, comprising a clamping electrode for each of the bodies to be welded, means for electrically controlling the clamping of said bodies in said electrodes, an electro-magnet actuating said clamp controlling means and connected to a direct current circuit, and means for establishing an alternating current circuit at the welding joint.

22. An electrically operated apparatus for electric welding, comprising a clamping electrode for each of the bodies to be welded, means for electrically controlling the clamping of said bodies in said electrodes, an electro-magnet actuating said clamp controlling means and connected to a direct current circuit, means for establishing an alternating current circuit at the welding joint, means for subjecting the joint between said bodies to increased pressure after said clamping is effected, an electro-magnet actuating said pressure means, the said magnets being connected to a source of direct current, and means for establishing an alternating current circuit at the welding joint.

23. An electrically operated apparatus for electric welding, comprising a clamping electrode for each of the bodies to be welded, means for electrically controlling the clamping of said bodies in said electrodes, an electro-magnet actuating said clamp controlling means and connected to a direct current circuit, means for establishing an alternating current circuit at the welding joint, means for subjecting the joint between said bodies to increased pressure after said clamping is effected, an electro-magnet actuating said pressure means, the said magnets being connected to a source of direct current, means for establishing an alternating current circuit at the welding joint, and means for determining the duration of said welding current.

24. An electrically operated apparatus for electric welding, comprising a clamping electrode for each of the bodies to be welded, means for electrically controlling the clamping of said bodies in said electrodes, an electro-magnet actuating said clamp controlling means and connected in a direct current circuit, means for subjecting the joint between said bodies to increased pressure after said clamping is effected, an electro-magnet actuating said pressure means, said magnets being connected in direct current circuit, means for establishing an alternating circuit at the welding joint, a manually controllable switch lever, and three contacts coöperating therewith respectively connected in circuit with said magnets and said alternating current establishing means: whereby upon the movement of said lever, circuit is closed first to the clamp controlling electro-magnet, second, to the pressure controlling magnet, and, third, to said alternating current establishing means.

In testimony whereof we have affixed our signatures in presence of two witnesses.

HARRY R. WOODROW.
THOMAS E. MURRAY.

Witnesses:
GERTRUDE T. PORTER.
MAY T. McGARRY.